(12) United States Patent
Smith et al.

(10) Patent No.: US 12,435,049 B2
(45) Date of Patent: Oct. 7, 2025

(54) SYNTHESIS OF VINYLIC PROTECTED ALCOHOL INTERMEDIATES

(71) Applicant: AMGEN INC., Thousand Oaks, CA (US)

(72) Inventors: Austin G. Smith, Cary, NC (US); Liang Huang, Thousand Oaks, CA (US)

(73) Assignee: AMGEN INC., Thousand Oaks, CA (US)

( * ) Notice: Subject to any disclaimer, the term of this patent is extended or adjusted under 35 U.S.C. 154(b) by 408 days.

(21) Appl. No.: 17/918,607

(22) PCT Filed: Apr. 27, 2021

(86) PCT No.: PCT/US2021/029271
§ 371 (c)(1),
(2) Date: Oct. 13, 2022

(87) PCT Pub. No.: WO2021/225823
PCT Pub. Date: Nov. 11, 2021

(65) Prior Publication Data
US 2023/0174496 A1    Jun. 8, 2023

Related U.S. Application Data

(60) Provisional application No. 63/020,862, filed on May 6, 2020.

(51) Int. Cl.
| | | |
|---|---|---|
| C07D 267/12 | (2006.01) | |
| C07D 267/18 | (2006.01) | |
| C07D 513/04 | (2006.01) | |
| C07D 513/10 | (2006.01) | |
| C07D 519/00 | (2006.01) | |

(52) U.S. Cl.
CPC ......... C07D 267/18 (2013.01); C07D 513/04 (2013.01); C07D 519/00 (2013.01)

(58) Field of Classification Search
CPC .................... C07D 267/12; C07D 513/10
See application file for complete search history.

(56) References Cited

U.S. PATENT DOCUMENTS

| | | |
|---|---|---|
| 9,562,061 B2 | 2/2017 | Brown et al. |
| 10,300,075 B2 | 5/2019 | Brown et al. |
| 2023/0183164 A1* | 6/2023 | Smith ............ C07D 519/00 540/543 |

FOREIGN PATENT DOCUMENTS

| | | |
|---|---|---|
| WO | 2016/033486 A1 | 8/2017 |
| WO | 2018/183418 A1 | 10/2018 |
| WO | 2021/108254 A1 | 6/2021 |

OTHER PUBLICATIONS

PCT/US2021/029271 International Search Report and Written Opinion (8 pages).

* cited by examiner

Primary Examiner — Brenda L Coleman

(57) ABSTRACT

Provided herein are processes for synthesizing intermediates useful in preparing Mcl-1 inhibitors. In particular, provided herein are processes for synthesizing compound D, wherein OPG and $R^1$ are described herein. Compound D can be useful in synthesizing compound A1, or a salt of solvate thereof, and compound A2, or a salt of solvate thereof.

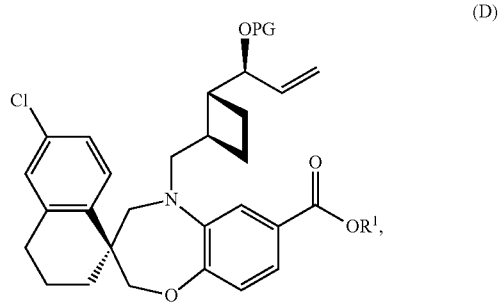

(D)

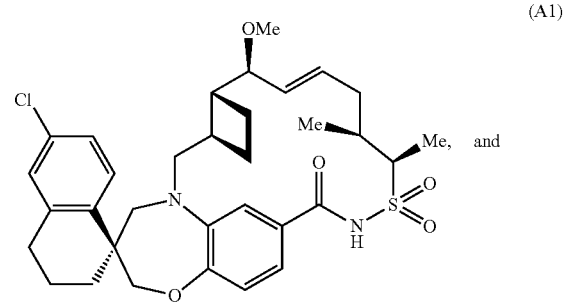

(A1) and

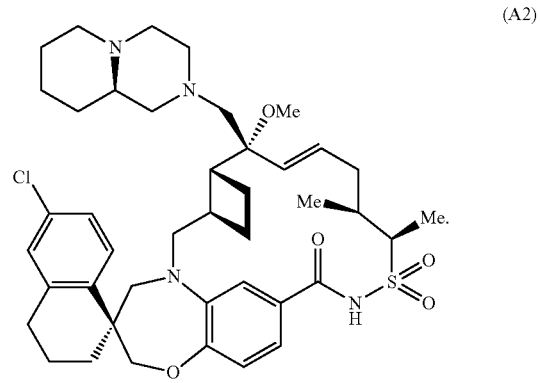

(A2)

39 Claims, No Drawings

SYNTHESIS OF VINYLIC PROTECTED ALCOHOL INTERMEDIATES

CROSS REFERENCES TO RELATED APPLICATIONS

This application claims the benefit of U.S. Provisional Application No. 63/020,862, filed on May 6, 2020, which is hereby incorporated by reference in its entirety and for all purposes as if fully set forth herein.

BACKGROUND

Technical Field

The present disclosure relates to processes for synthesizing an intermediate used in synthesizing (1S,3'R,6'R,7'S,8'E,11'S,12'R)-6-chloro-7'-methoxy-11',12'-dimethyl-3,4-dihydro-2H,15'H-spiro[naphthalene-1,22'[20]oxa[13]thia[1,14]diazatetracyclo[14.7.2.0$^{3,6}$.0$^{19,24}$]pentacosa[8,16,18,24]tetraen]-15'-one 13',13'-dioxide (compound A1; AMG 176), a salt, or solvate thereof, and (1S,3'R,6'R,7'R,8'E,11'S,12'R)-6-chloro-7'-methoxy-11',12'-dimethyl-7'-((9aR)-octahydro-2H-pyrido[1,2-a]pyrazin-2-ylmethyl)-3,4-dihydro-2H,15'H-spiro[naphthalene-1,22'[20]oxa[13]thia[1,14]diazatetracyclo[14.7.2.0$^{3,6}$.0$^{19,24}$]pentacosa[8,16,18,24]tetraen]-15'-one 13',13'-dioxide (compound A2; AMG 397), a salt, or solvate thereof. These compounds are inhibitors of myeloid cell leukemia 1 protein (Mcl-1).

Description of Related Technology

The compound, (1S,3'R,6'R,7'S,8'E,11'S,12'R)-6-chloro-7'-methoxy-11',12'-dimethyl-3,4-dihydro-2H,15'H-spiro[naphthalene-1,22'[20]oxa[13]thia[1,14]diazatetracyclo[14.7.2.0$^{3,6}$.0$^{19,24}$]pentacosa[8,16,18,24]tetraen]-15'-one 13',13'-dioxide (compound A1), is useful as an inhibitor of myeloid cell leukemia 1 (Mcl-1):

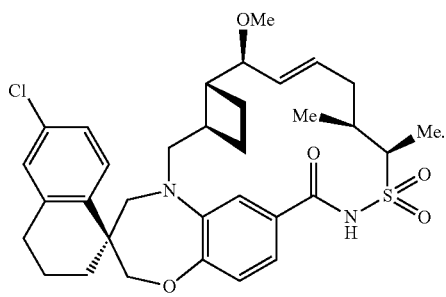

(A1)

The compound, (1S,3'R,6'R,7'R,8'E,11'S,12'R)-6-chloro-7'-methoxy-11',12'-dimethyl-7'-((9aR)-octahydro-2H-pyrido[1,2-a]pyrazin-2-ylmethyl)-3,4-dihydro-2H,15'H-spiro[naphthalene-1,22'-[20]oxa[13]thia[1,14]diazatetracyclo[14.7.2.0$^{3,6}$.0$^{19,24}$]pentacosa[8,16,18,24]tetraen]-15'-one 13',13'-dioxide (compound A2), is useful as an inhibitor of myeloid cell leukemia 1 (Mcl-1):

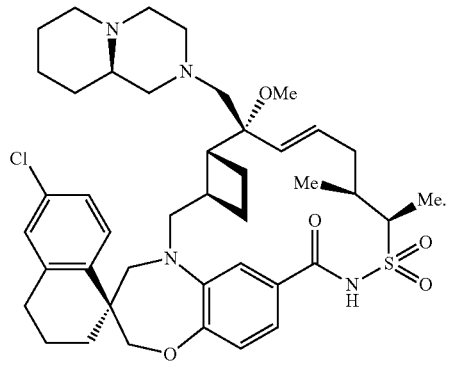

(A2)

One common characteristic of human cancer is overexpression of Mcl-1. Mcl-1 overexpression prevents cancer cells from undergoing programmed cell death (apoptosis), allowing the cells to survive despite widespread genetic damage.

Mcl-1 is a member of the Bcl-2 family of proteins. The Bcl-2 family includes pro-apoptotic members (such as BAX and BAK) which, upon activation, form a homo-oligomer in the outer mitochondrial membrane that leads to pore formation and the escape of mitochondrial contents, a step in triggering apoptosis. Antiapoptotic members of the Bcl-2 family (such as Bcl-2, Bcl-XL, and Mcl-1) block the activity of BAX and BAK. Other proteins (such as BID, BIM, BIK, and BAD) exhibit additional regulatory functions. Research has shown that Mcl-1 inhibitors can be useful for the treatment of cancers. Mcl-1 is overexpressed in numerous cancers.

U.S. Pat. No. 9,562,061, which is incorporated herein by reference in its entirety, discloses compound A1 as an Mcl-1 inhibitor and provides a method for preparing it. However, improved synthetic methods that result in greater yield and purity of compound A1 are desired, particularly for the commercial production of compound A1.

U.S. Pat. No. 10,300,075, which is incorporated herein by reference in its entirety, discloses compound A2 as an Mcl-1 inhibitor and provides a method for preparing it. However, improved synthetic methods that result in greater yield and purity of compound A2 are desired, particularly for the commercial production of compound A2.

SUMMARY

Provided herein are processes for synthesizing compound D:

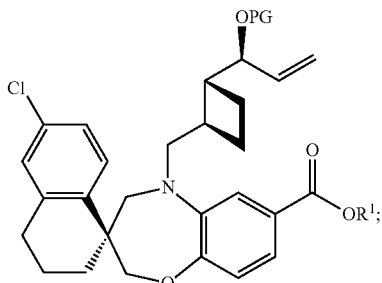

(D)

comprising (a) admixing compound B, or a salt thereof, and compound C in an organic solvent to form a slurry, wherein the organic solvent is selected from the group consisting of a nonpolar aromatic solvent, an ether solvent, a chlorinated solvent, an alcohol solvent, acetonitrile, dimethylformamide (DMF), dimethylcarbonate, dimethylacetamide (DMAc), N-methylpyrrolidinone (NMP), and a combination thereof:

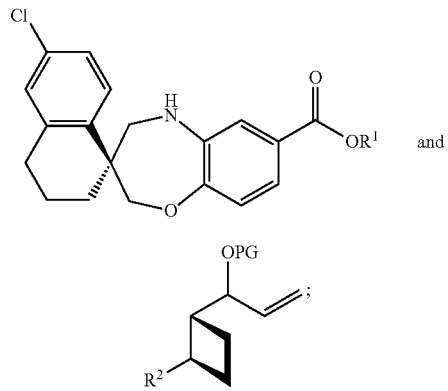
(B)

(C)

and (b) admixing the slurry of step (a) and a reducing agent to form a mixture comprising compound D; wherein: OPG is an alcohol protecting group selected from the group consisting of an ether, an acetal or ketal, an acyl, a sulfonyl, and a silyl ether; $R^1$ is H or $C_{1-6}$alkyl; and $R^2$ is a protected aldehyde.

In various embodiments, the processes further comprise admixing

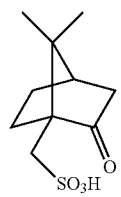

in the organic solvent in step (a).

In various embodiments, compound B is a salt. In various embodiments, $R^1$ is H. In various embodiments, $R^1$ is methyl, ethyl, n-propyl, or tert-butyl.

In various embodiments, OPG is selected from the group consisting of

(methoxy),

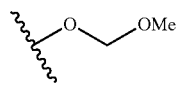

(tert-butyl ether),

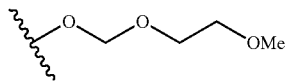 [SMILES: *OCOCCOC]

(methoxymethyl acetal, MOM),

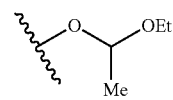

(2-methoxyethoxymethyl ether, MEM),

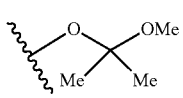

(ethoxyethyl acetal, EE),

(methoxypropyl acetal, MOP),

(tetrahydropyranyl acetal, THP),

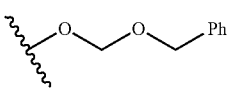

(benzyloxymethyl acetal, BOM),

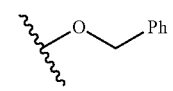

(benzyl ether, Bn),

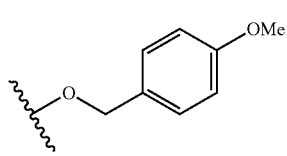 [SMILES: *OCc1ccc(OC)cc1]

(4-methoxybenzyl ether, PMB),

5
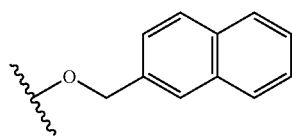 [SMILES: *OCc1ccc2ccccc2c1]
(2-naphthylmethyl ether, Nap),
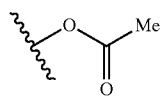
(acetyl, Ac),
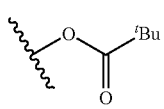
pivaloyl(Piv),
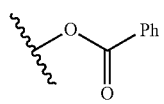
(benzoyl, Bz),
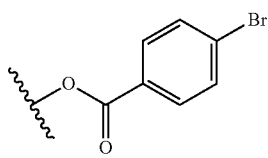 [SMILES: *OC(=O)c1ccc(Br)cc1]
(4-bromobenzoyl, Br-Bz),
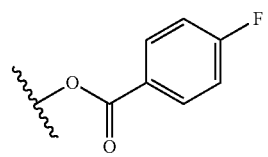 [SMILES: *OC(=O)c1ccc(F)cc1]
(4-fluorobenzoyl),
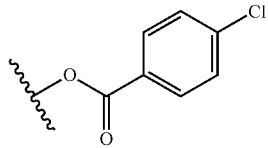 [SMILES: *OC(=O)c1ccc(Cl)cc1]
(4-chlorobenzoyl),
6
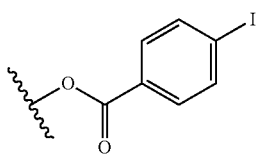 [SMILES: *OC(=O)c1ccc(I)cc1]
(4-iodobenzoyl),
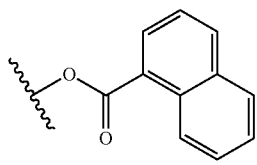 [SMILES: *OC(=O)c1cccc2ccccc12]
(4-nitrobenzoyl),
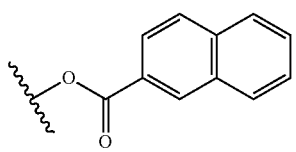 [SMILES: *OC(=O)c1ccc2ccccc2c1]
(4-phenylbenzoyl),
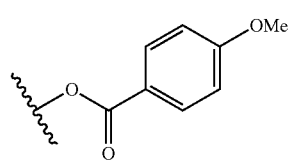 [SMILES: *OC(=O)c1ccc(OC)cc1]
(1-naphthoyl ester),
(2-naphthoyl ester),
(4-methoxybenzoyl),

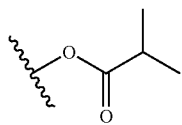 [SMILES: *OC(=O)C(C)C]

(isobutyryl), OSiEt₃ (triethylsilyl ether, TES), OSi($^i$Pr)₃ (triisopropylsilyl ether, TIPS), OSiMe₃ (trimethylsilyl ether, TMS), OSiMe₂tBu (tert-butyldimethylsilyl ether, TBS), OSiPh₂$^t$Bu (tert-butyldiphenylsilyl ether, TBDPS), OSO₂Me (mesyl),

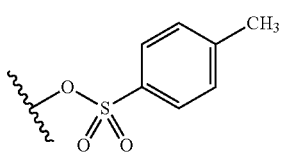 [SMILES: *OS(=O)(=O)c1ccc(C)cc1]

(4-toluenesulfonyl, tosyl),

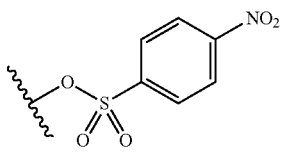 [SMILES: *OS(=O)(=O)c1ccc([N+](=O)[O-])cc1]

(4-nitrobenzenesulfonyl, nosyl), and OSO₂CF₃ (triflyl). In some cases, OPG is 4-bromobenzoyl.

In various embodiments, R² is a protected aldehyde. In some cases, the protected aldehyde is selected from the group consisting of

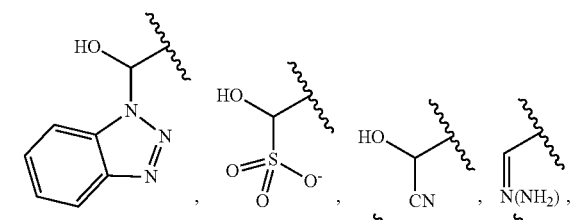

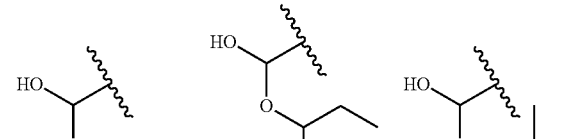

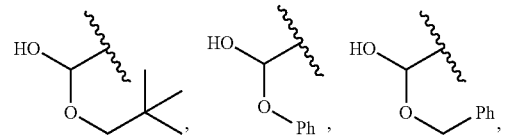

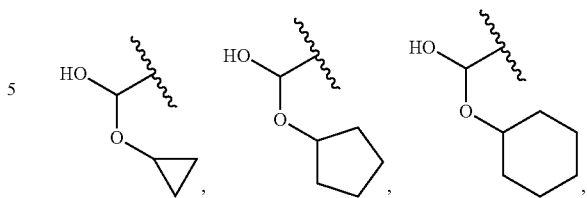

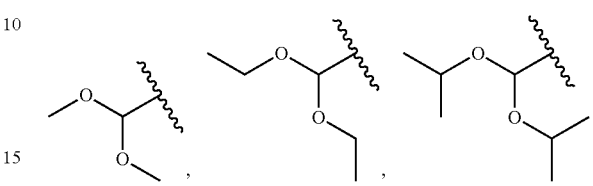

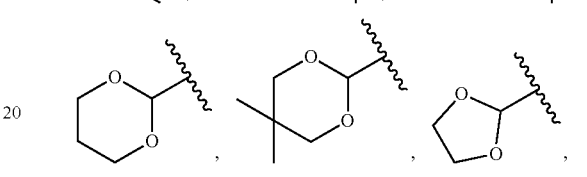

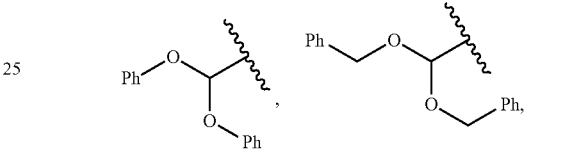

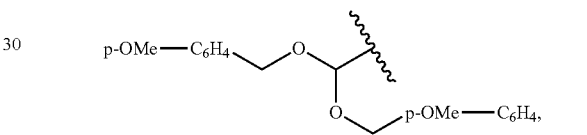

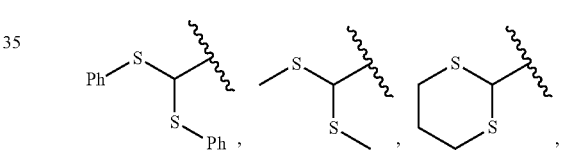

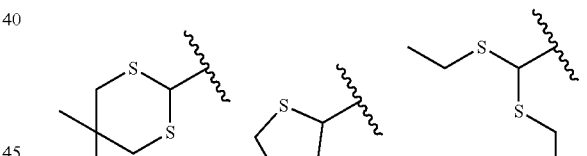

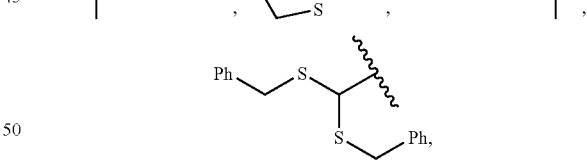

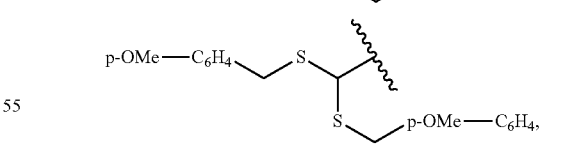

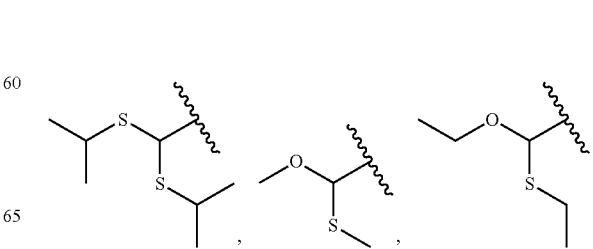

-continued

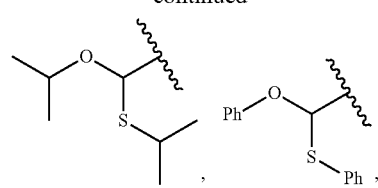

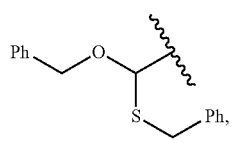

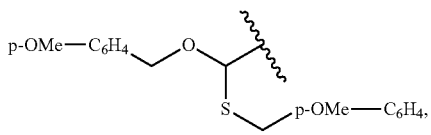

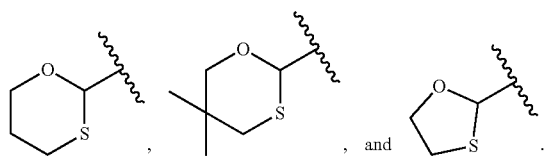

In some cases, $R^2$ is

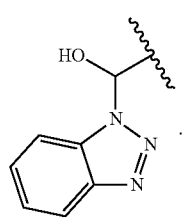 [SMILES: *C(O)n1nnc2ccccc21]

In various embodiments, compound C has a structure:

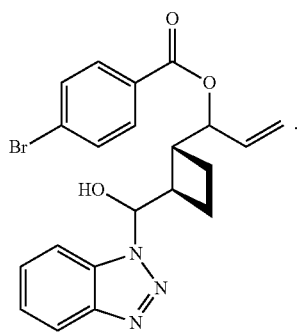

In various embodiments, compound D has a structure:

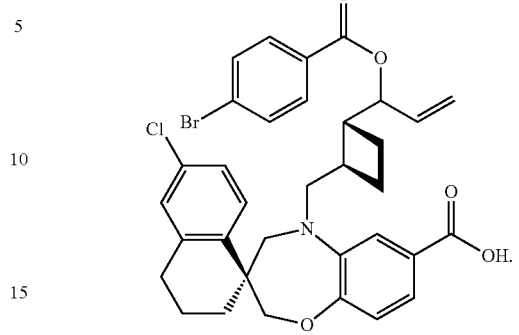

In various embodiments, the reducing agent is selected from the group consisting of a borohydride, a borane, a silane, a Hantzsch ester, a formic acid/amine base/metal catalyst, and a hydrogen/metal catalyst. In some cases, the reducing agent is selected from the group consisting of $NaBH(OAc)_3$, $NaBH_3CN$, $NaBH_4$, picoline borane (pic-$BH_3$), borane tetrahydrofuran ($BH_3$-THF), decaborane ($B_{10}H_{14}$), borane dimethyl sulfide ($BH_3$—$S(Me)_2$), an N-heterocyclic carbene borane (NHC-borane), triethylsilane, phenylsilane, diphenylsilane,

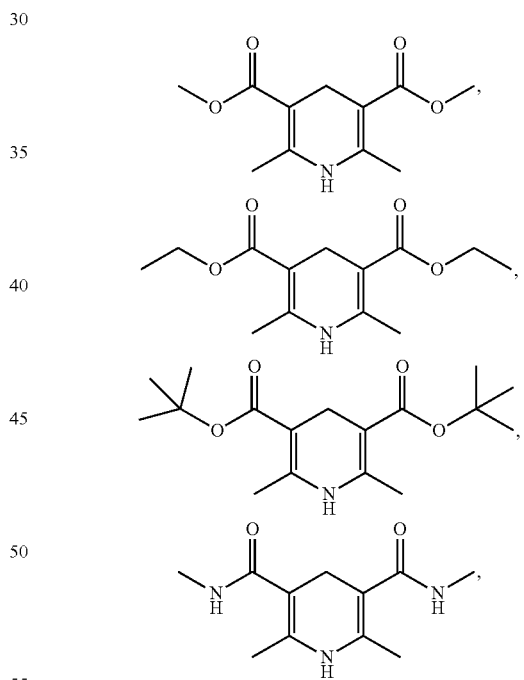

$H_2$/Pd, $H_2$/Rh, $H_2$/Ir, $H_2$/Ru, formic acid/triethylamine/Rh, formic acid/triethylamine/Ir, and formic acid/triethylamine/Ru. In some cases, the reducing agent is $NaBH(OAc)_3$.

In various embodiments, the organic solvent is selected from the group consisting of toluene, benzene, xylene, tetrahydrofuran (THF), tetrahydropyran, tetrahydrofurfuryl alcohol, diethyl ether, dibutyl ether, diisopropyl ether, dimethoxymethane, 1,2-dimethoxyethane, 1,4-dixoane, dichloromethane (DCM), carbon tetrachloride, chloroform, 1,2-dichloroethane, 2-methyltetrahydrofuran (2-MeTHF), methyl tert-butyl ether (MTBE), and a combination thereof.

In some cases, the organic solvent is selected from the group consisting of toluene, THF, DCM, and a combination thereof. In some cases, the organic solvent is toluene.

In various embodiments, compound B and compound C are present in a molar ratio of B:C of 1:1 to 1:2. In some cases, the molar ratio of B:C is 1:1.1.

In various embodiments, compound B and the reducing agent are present in a molar ratio of 1:1 to 1:2.25. In some cases, the molar ratio of compound B to the reducing agent is 1:1.25.

In various embodiments, each of step (a) and step (b) occurs at a temperature of 10° C. to 40° C. In some cases, each of step (a) and step (b) occurs at a temperature of 20° C.

In various embodiments, the admixing of step (a) occurs for 1 minute to 1 hour. In some cases, the admixing of step (a) occurs for 30 minutes.

In various embodiments, the reducing agent is added to the slurry within 60 seconds. In various embodiments, the reducing agent is added to the slurry over 10 minutes to 1 hour. In various embodiments, the reducing agent is added to the slurry in two or more equal portions. In some cases, the reducing agent is added to the slurry in four equal portions. In some cases, the equal portions are added 15 minutes apart.

In various embodiments, the admixing of step (b) occurs for 5 hours to 20 hours. In some cases, the admixing of step (b) occurs for 16 hours.

In various embodiments, steps (a) and (b) occur in sequence in a single reaction vessel.

In various embodiments, the processes further comprise: (c) extracting compound D from the mixture of step (b). In some cases, the extracting is via crystallizing compound D. In some cases, the crystallizing is performed with an organic solvent selected from the group consisting of toluene, benzene, xylene, tetrahydrofuran (THF), tetrahydropyran, tetrahydrofurfuryl alcohol, heptane, diethyl ether, dibutyl ether, diisopropyl ether, dimethoxymethane, dimethoxyethane (DME), 1,4-dixoane, dichloromethane (DCM), carbon tetrachloride, chloroform, 1,2-dichloroethane, 2-methyltetrahydrofuran (2-MeTHF), methyl tert-butyl ether (MTBE), and a combination thereof. In some cases, the crystallizing is performed with toluene and heptane.

In various embodiments, the processes further comprise synthesizing compound A1, or a salt or solvate thereof, using compound D:

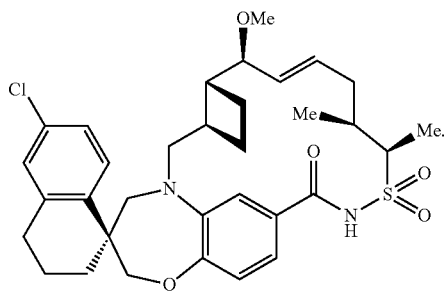

(A1)

In various embodiments, the processes further comprise synthesizing compound A2, or a salt of solvate thereof, using compound D:

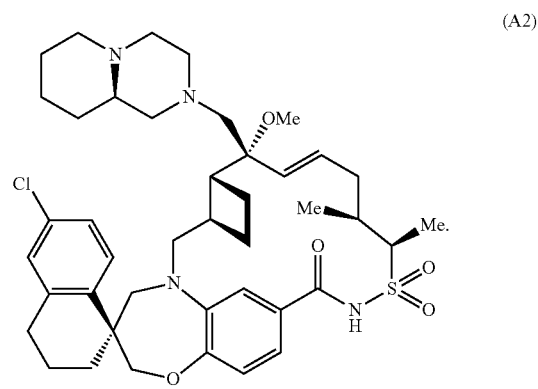

(A2)

Further aspects and advantages will be apparent to those of ordinary skill in the art from a review of the following detailed description. The description hereafter includes specific embodiments with the understanding that the disclosure is illustrative, and is not intended to limit the invention to the specific embodiments described herein.

DETAILED DESCRIPTION

Provided herein are processes for synthesizing Mcl-1 inhibitors and corresponding vinylic protected alcohol intermediates. In particular, processes for synthesizing (1S,3'R,6'R,7'S,8'E,11'S,12'R)-6-chloro-7'-methoxy-11',12'-dimethyl-3,4-dihydro-2H,15'H-spiro[naphthalene-1,22'[20]oxa[13]thia[1,14]diazatetracyclo[14.7.2.0$^{3,6}$.0$^{19,24}$]pentacosa[8,16,18,24]tetraen]-15'-one 13',13'-dioxide (compound A1), or a salt or solvate thereof, and for synthesizing (1S,3'R,6'R,7'R,8'E,11'S,12'R)-6-chloro-7'-methoxy-11',12'-dinethyl-7'-((9aR)-octahydro-2H-pyrido[1,2-a]pyrazin-2-ylmethyl)-3,4-dihydro-2H,15'H-spiro[naphthalene-1,22'[20]oxa[13]thia[1,14]diazatetracyclo[14.7.2.0$^{3,6}$.0$^{19,24}$]pentacosa[8,16,18,24]tetraen]-15'-one 13',13'-dioxide (compound A2) or a salt or solvate thereof, are provided:

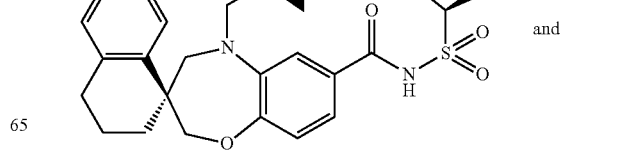

(A1) and

13

-continued

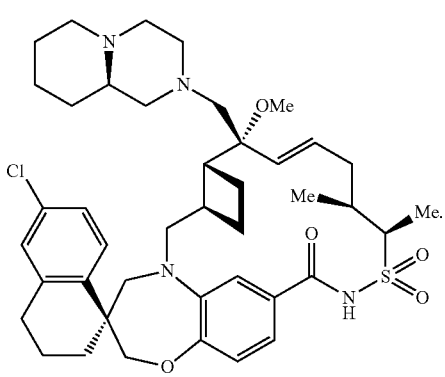

(A2)

U.S. Pat. No. 9,562,061, which is incorporated herein by reference in its entirety, discloses compound A1, or a salt or solvate thereof, as an Mcl-1 inhibitor and provides a process for preparing it. The disclosure of compound A1 salts and solvates from U.S. Pat. No. 9,562,061 is incorporated by reference in its entirety. This patent also discloses a process of synthesizing a vinylic alcohol intermediate compound shown below used in the synthesis of compound A1.

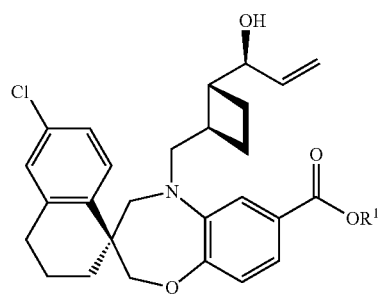

vinylic alcohol intermediate of '061 patent

U.S. Pat. No. 10,300,075, which is incorporated herein by reference in its entirety, discloses compound A2, or a salt or solvate thereof, as an Mcl-1 inhibitor and provides a process for preparing it. The disclosure of compound A2 salts and solvates from U.S. Pat. No. 10,300,075 is incorporated by reference in its entirety. This patent also discloses a process of synthesizing a vinylic alcohol intermediate compound shown above used in the synthesis of compound A2.

The '061 patent generally describes a procedure for making a vinylic alcohol intermediate as shown in Scheme 1, below, which is adapted from the disclosure at col. 49 of the '061 patent. The '061 patent describes that the cyclobutane carbaldehyde (intermediate II) is combined with the oxazepine (intermediate I) in a solvent at a temperature below room temperature preferably 0° C. Sodium cyanoborohydride is added, and the mixture is added to a sodium hydroxide solution, thereby providing intermediate Ill. Advantageously, the processes described herein provide an improved synthetic route as compared to General Procedure 1 of the '061 patent. The processes described herein can be performed at ambient conditions (e.g., room temperature) and with milder reagents. Moreover, the processes can utilize a crystalline vinyl cyclobutyl intermediate which allows for improved isolation, storage, and purity throughout the processes, as compared to the vinyl cyclobutyl intermediate of the '061 patent.

14

Scheme 1—General Procedure of the '061 Patent

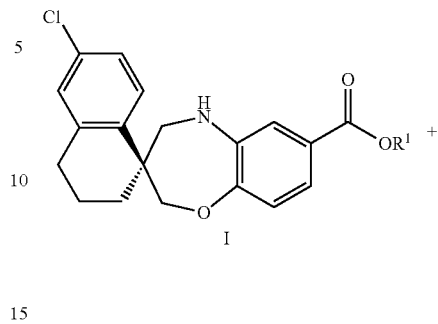

$R^1 = H_1, C_{1-6}alkyl, and (CH_2CH_2O)_nCH_3$

The '061 patent further describes a process for synthesizing the vinylic alcohol intermediate in which the vinyl group is added to the compound after the fragment including the cyclobutyl moiety is already joined with the benzoxazepine moiety. For example, Scheme 2, as shown below and adapted from the disclosure at cols. 66-71 of the '061 patent, represents the general process of synthesizing the vinylic alcohol as described in the '061 patent. The '061 patent describes the isolation of each of the intermediate compounds prior to use in the next step of the synthesis. Advantageously, the processes described herein require fewer steps than the process of the '061 patent, and do not require isolation of any intermediates. Moreover, the processes described herein provide a convergent fragment assembly of compounds A1 and A2, provide a superior purity profile, provide for highly crystalline intermediates, thereby improving stability, and have an overall higher yield, as compared to the '061 patent.

Scheme 2—Synthesis of Vinylic Alcohol Intermediate of the '061 Patent

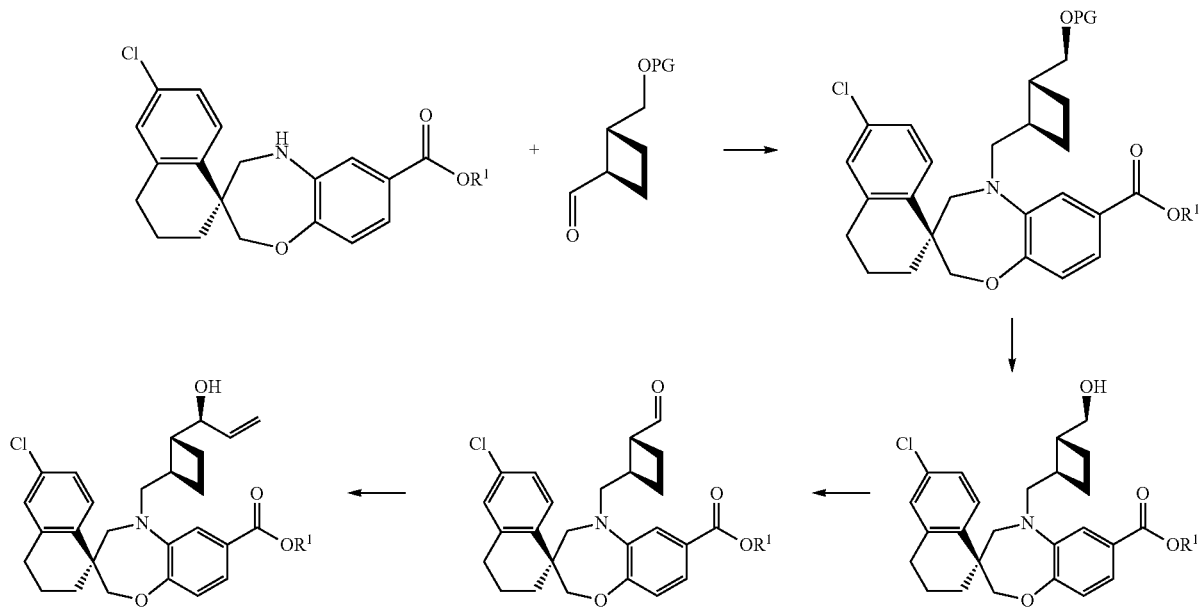

Described herein are processes for synthesizing compound D or a salt or solvate thereof:

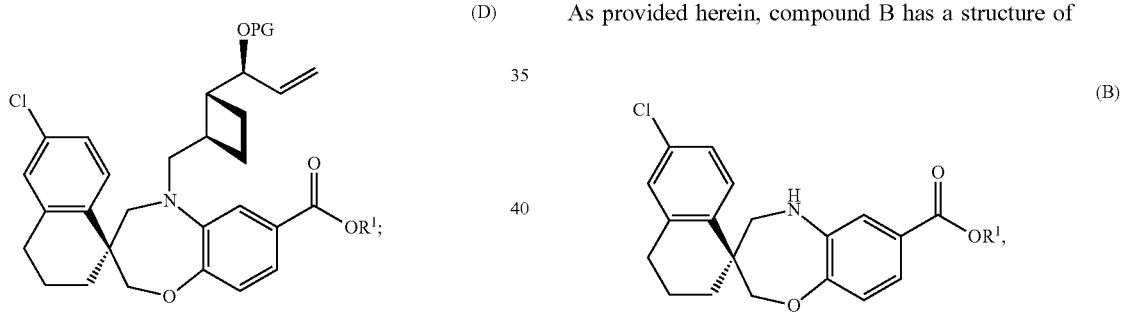

(D)

comprising (a) admixing compound B, or a salt thereof, and compound C in an organic solvent to form a slurry, and (b) admixing the slurry of step (a) and a reducing agent to form a mixture comprising compound D, as discussed in detail below. As will be appreciated, the disclosed processes involve formation of an intermediate compound formed by reaction of the amine of compound B and the aldehyde or protected aldehyde of compound C, then reduction of that intermediate to form the nitrogen-carbon bond of compound D. The processes disclosed herein to form compound D can be performed in sequence in a single reaction vessel, without need to isolate the intermediate formed in step (a) between compounds B and C. Optionally, compound D can be isolated via extraction (e.g., crystallization) to form crystalline compound D, which can be used in further reactions in the preparation of compound A.

Step A

The processes of the disclosure include admixing compound B, or a salt thereof, and compound C in an organic solvent to form a slurry. It will be appreciated that the admixture of compounds B and C in step (a) form an intermediate compound, which is not isolated, from the coupling of the nitrogen of compound B and the aldehyde or protected aldehyde of compound C.

As provided herein, compound B has a structure of (B)

or a salt thereof, wherein $R^1$ is H or $C_{1-6}$ alkyl. In some embodiments, $R^1$ is H. In other embodiments, $R^1$ is $C_{1-6}$ alkyl. As used herein, the term "alkyl" refers to straight chained and branched saturated hydrocarbon groups. The term $C_n$ means the group has "n" carbon atoms. For example, $C_3$ alkyl refers to an alkyl group that has 3 carbon atoms. $C_{1-6}$ alkyl refers to an alkyl group having a number of carbon atoms encompassing the entire range (i.e., 1 to 6 carbon atoms), as well as all subgroups (e.g., 2-6, 1-5, 1-4, 3-6, 3-5, 1, 2, 3, 4, 5, and 6 carbon atoms). Nonlimiting examples of alkyl groups include methyl, ethyl, n-propyl, isopropyl, n-butyl, sec-butyl (2-methylpropyl), tert-butyl (1,1-dimethylethyl), n-pentyl, and n-hexyl. In some embodiments, $R^1$ is methyl, ethyl, n-propyl, or tert-butyl.

In some embodiments, compound B is a salt. A salt of compound B can be prepared, for example, by reacting compound B in its free base form (i.e., when $R^1$ is H) with a suitable organic or inorganic acid, and optionally isolating the salt thus formed. Nonlimiting examples of suitable salts include hydrobromide, hydrochloride, sulfate, bisulfate, sulfonate, camphorsulfonate, phosphate, nitrate, acetate, valerate, oleate, palmitate, stearate, laurate, benzoate, lactate, phosphate, tosylate, citrate, maleate, fumarate, succinate, tartrate, naphthylate, mesylate, glucoheptonate, lactobionate, laurylsulphonate salts, and amino acid salts, and the like. In some embodiments, compound B is a camphorsulfonate salt (i.e., compound B in its free acid form is reacted with camphorsulfonic acid).

As provided herein, compound C has a structure of

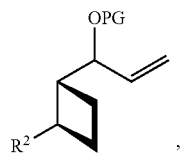

wherein $R^2$ is CHO (i.e., an aldehyde) or a protected aldehyde, and OPG is an alcohol protecting group. In some embodiments, $R^2$ is CHO. In other embodiments, $R^2$ is a protected aldehyde.

The term "protected aldehyde" or "aldehyde protecting group" refers to any protecting group used to mask the aldehyde functionality. Aldehyde protecting groups include acetals and hemiacetals. The acetals and hemiacetals can be prepared from $C_{1-8}$ alcohols or $C_{2-8}$ diols. In some cases, the protected aldehyde is a five or six membered cyclic acetal formed from condensation of the aldehyde with ethylene or propylene glycol. In some cases, the protected aldehyde is an imine or hydroxyimine. In some cases, the protected aldehyde comprises a bisulfite or a benzotriazole. In some embodiments, the protected aldehyde is selected from the group consisting of

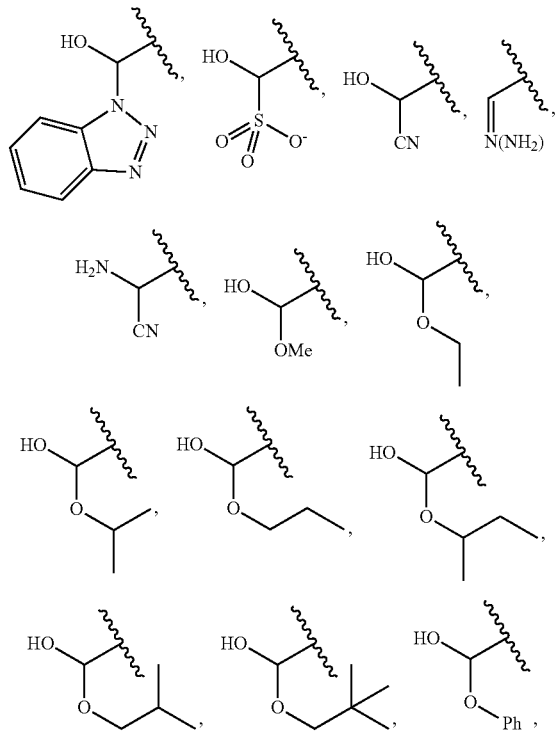

-continued

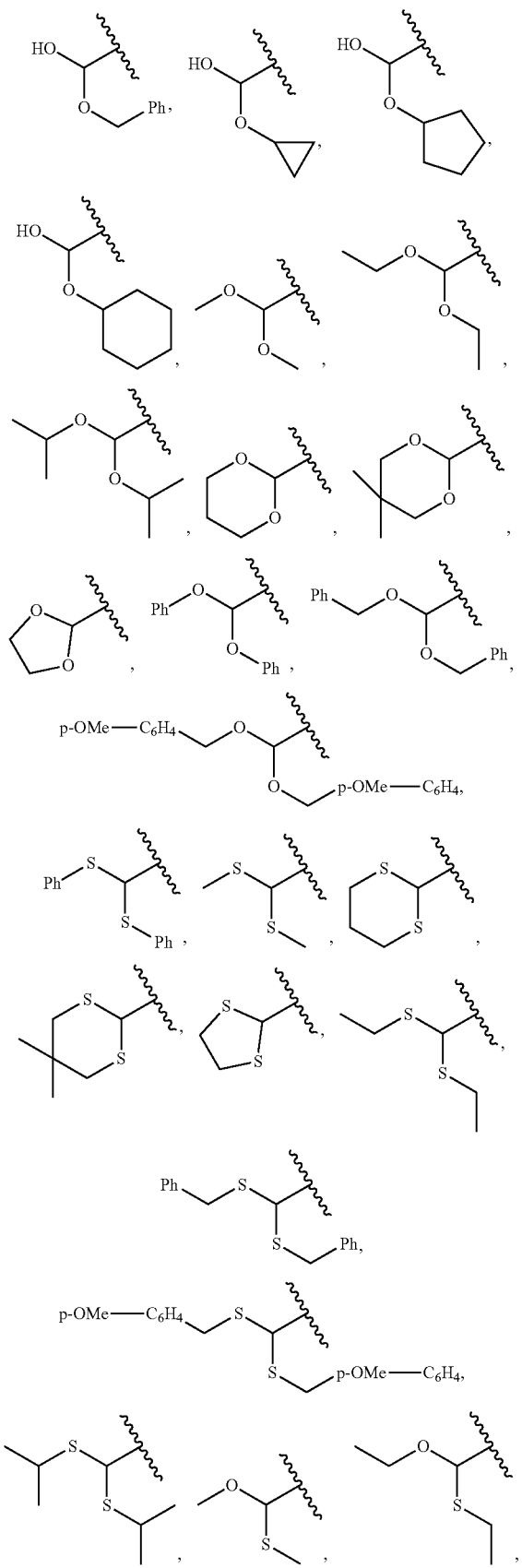

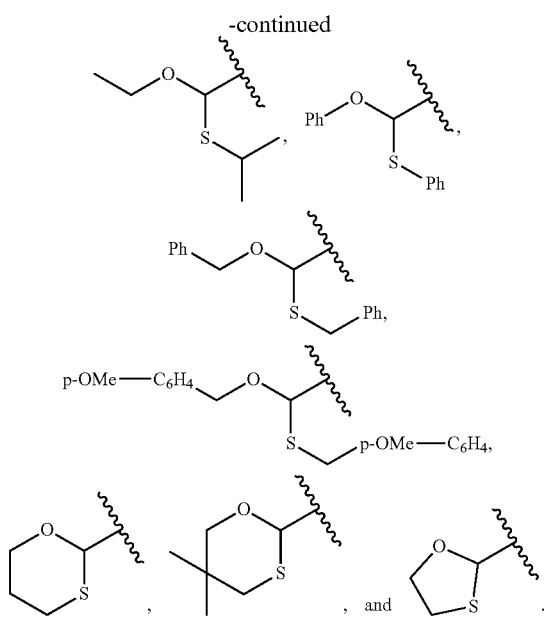

In some embodiments, the protected aldehyde is

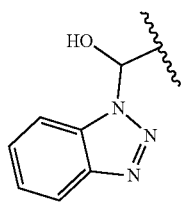

In some embodiments, the protected aldehyde is

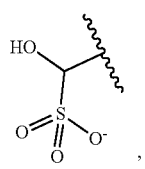

wherein the counterion is, for example, a sodium ion.

Alcohol protecting groups are groups that mask a hydroxyl functional group, and are well known in the art. Preparation of compounds can involve the protection and deprotection of various hydroxyl groups. The need for protection and deprotection, and the selection of appropriate protecting groups can be readily determined by one skilled in the art. The chemistry of protecting groups can be found, for example, in Greene, et al., Protective Groups in Organic Synthesis, 4d. Ed., Wiley & Sons, 2007, which is incorporated herein by reference in its entirety. Adjustments to the alcohol protecting groups and formation and cleavage methods described herein may be adjusted as necessary in light of the various substituents. In some cases, the alcohol protecting group, OPG, is selected from the group consisting of an ether, an acetal or ketal, an acyl, a sulfonyl, and a silyl ether.

In some embodiments, OPG is an ether. Ether protecting groups comprise an alkyl moiety, either substituted or unsubstituted, attached to the oxygen from the hydroxyl group being protected (e.g., masked as an ether). Examples of suitable ethers include, but are not limited to, methoxy, ethoxy, propoxy, butoxy, methoxymethyl acetal (MOM), 2-methyoxyethoxymethyl ester (MEM), ethoxyethyl acetal (EE), and methoxypropyl ether (MOP). Other examples of contemplated ethers include, but are not limited to, benzyloxymethyl acetal (BOM), benzyl ether (Bn), 4-methoxybenzyl ether (PMB), and 2-naphthylmethyl ether (Nap).

In some embodiments, OPG is an acetal or ketal. Acetals as a protecting group have a general structure of

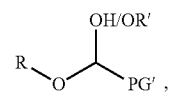

and can be as acetals (as OR' option, where R' is, e.g., an alkyl group) or as hemiacetals (as OH option), where R—O is derived from the hydroxyl group being protected and PG' is the rest of the (hemi)acetal protecting group. Ketals as a protecting group have a general structure of

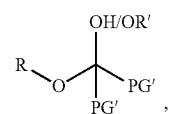

where R—O is derived from the hydroxyl group being protected and can be as ketals (as OR' option, where R' is, e.g., an alkyl group) or as hemiketals (as OH option), and each PG' is derived from the rest of the (hemi)ketal protecting group) mask the hydroxyl group (i.e., R—OH) and can be substituted or unsubstituted. An example of a suitable acetal includes, but is not limited to, tetrahydropyranyl acetal (THP).

In some embodiments, OPG is an acyl. As used herein, the term "acyl" refers to an alcohol protecting group in which the oxygen atom of the alcohol is bound to an acyl group—

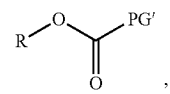

where R—O is derived from the hydroxyl group being protected and PG' is derived from the rest of the acyl protecting group. Examples of suitable acyls include, but are not limited to, acetyl (Ac), pivaloyl (Piv), benzoyl (Bz), 4-bromobenzoyl (Br-Bz), 4-fluorobenzoyl, 4-chlorobenzoyl, 4-iodobenzoyl, 4-nitrobenzoyl, 4-phenylbenzoyl, 1-naphthoyl ester, 2-naphthoyl ester, 4-methoxybenzoyl, and isobutyryl.

In some embodiments, OPG is a silyl ether. As used herein, the term "silyl ether" refers to an alcohol protecting group in which the oxygen atom of the alcohol is bound to a silyl ether group—

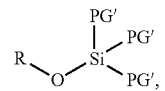

where R—O is derived from the hydroxyl group being protected and each PG' is derived from the rest of the silyl ether protecting group. Examples of suitable silyl ethers include, but are not limited to triethylsilyl ether (TES), triisopropylsilyl ether (TIPS), trimethylsilyl ether (TMS), tert-butyldimethylsilyl ether (TBS), and tert-butyldiphenylsilyl ether (TBDPS).

In some embodiments, OPG is a sulfonyl protecting group. As used herein, the term "sulfonyl protecting group" refers to an alcohol protecting group in which the oxygen atom of the alcohol is bound to a sulfonyl group—

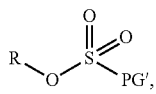

where R—O is derived from the hydroxyl group being protected and PG' is derived from the rest of the sulfonyl protecting group. In some embodiments, the sulfonyl protecting group is selected from the group consisting of mesyl, tosyl, nosyl, and triflyl.

In some embodiments, OPG is selected from the group consisting of

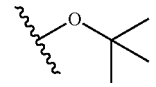

(methoxy),

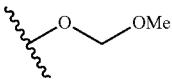 [SMILES: *OCOC]

(tert-butyl ether),

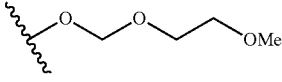 [SMILES: *OCOCCOC]

(methoxymethyl acetal, MOM),

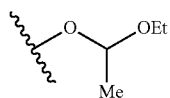

(2methoxyethoxymethyl ether, MEM),

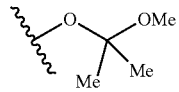

(ethoxyethyl acetal, EE),

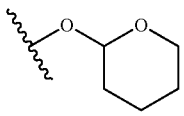 [SMILES: *OC1CCCCO1]

(methoxypropyl acetal, MOP),

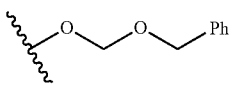

(tetrahydropyranyl acetal, THP),

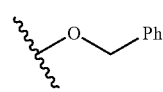

(benzyloxymethyl acetal, BOM),

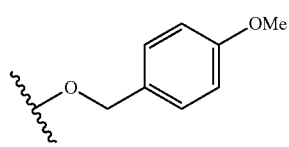 [SMILES: *OCc1ccc(OC)cc1]

(benzyl ether, Bn),

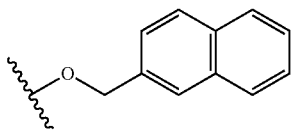 [SMILES: *OCc1ccc2ccccc2c1]

(4-methoxybenzyl ether, PMB),

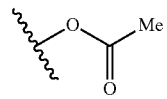 [SMILES: *OC(C)=O]

(2-naphthylmethyl ether, Nap),

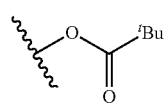

(acetyl, Ac), pivaloyl (Piv),

(benzoyl, Bz),

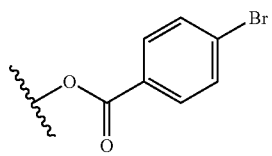 [SMILES: *OC(=O)c1ccc(Br)cc1]

(4-bromobenzoyl, Br-Bz),

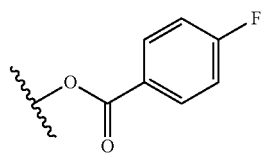 [SMILES: *OC(=O)c1ccc(F)cc1]

(4-fluorobenzoyl),

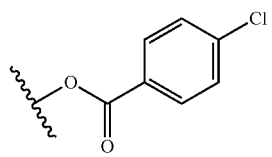 [SMILES: *OC(=O)c1ccc(Cl)cc1]

(4-chlorobenzoyl),

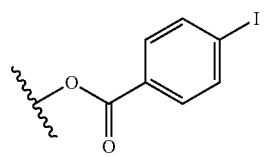 [SMILES: *OC(=O)c1ccc(I)cc1]

(4-iodobenzoyl),

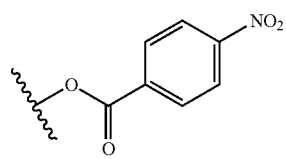 [SMILES: *OC(=O)c1ccc([N+](=O)[O-])cc1]

(4-nitrobenzoyl),

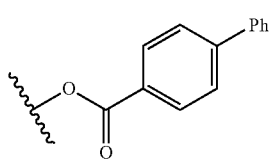 [SMILES: *OC(=O)c1ccc(-c2ccccc2)cc1]

(4-phenylbenzoyl),

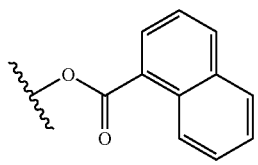 [SMILES: *OC(=O)c1cccc2ccccc12]

(1-naphthoyl ester),

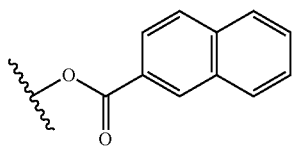 [SMILES: *OC(=O)c1ccc2ccccc2c1]

(2-naphthoyl ester),

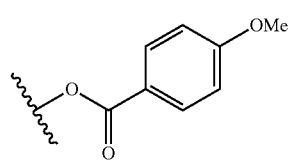 [SMILES: *OC(=O)c1ccc(OC)cc1]

(4-methoxybenzoyl),

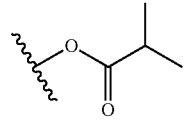 [SMILES: *OC(=O)C(C)C]

(isobutyryl), OSiEt$_3$ (triethylsilyl ether, TES), OSi($^i$Pr)$_3$ (triisopropylsilyl ether, TIPS), OSiMe$_3$ (trimethylsilyl ether, TMS), OSiMe$_2$tBu (tert-butyldimethylsilyl ether, TBS), OSiPh$_2$$^t$Bu (tert-butyldiphenylsilyl ether, TBDPS), OSO$_2$Me (mesyl),

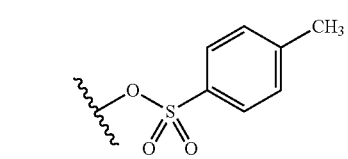 [SMILES: *OS(=O)(=O)c1ccc(C)cc1]

(4-toluenesulfonyl, tosyl),

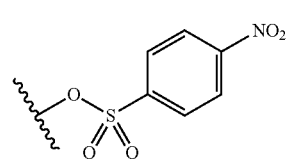 [SMILES: *OS(=O)(=O)c1ccc([N+](=O)[O-])cc1]

(4-nitrobenzenesulfonyl, nosyl), and OSO$_2$CF$_3$ (triflyl). In some embodiments, OPG is 4-bromobenzoyl.

In some embodiments, OPG is 4-bromobenzoyl and $R^1$ is

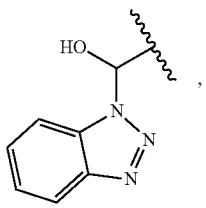 [SMILES: *C(O)n1nnc2ccccc21]

i.e., compound C has a structure of

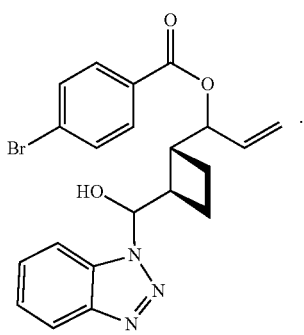

The admixing of step (a) of compound B and C is performed in the presence of an organic solvent. Compound B and compound C can be present in the organic solvent in a molar ratio of B:C of 1:1 to 1:2, for example at least a molar ratio of 1:1, 1:1.1, 1:1.2, 1:1.3, 1:1.4, or 1:1.5, and/or up to a molar ratio of 1:2, 1:1.9, 1:1.7, 1:1.6, 1:1.5, or 1:1.4, such as, 1:1 to 1:1.5, 1:1 to 1:1.4, or 1:1.1 to 1:1.3. In some embodiments, the molar ratio of compound B to compound C is 1:1.1.

The organic solvent of step (a) is selected from the group consisting of a nonpolar aromatic solvent, an ether solvent, a chlorinated solvent, an alcohol solvent, acetonitrile, dimethylformamide (DMF), dimethylacetamide (DMAc), N-methylpyrrolidinone (NMP), dimethylcarbonate, and a combination thereof. Nonlimiting examples of nonpolar aromatic solvents include toluene, benzene, xylene, chlorobenzene, fluorobenzene, naphthalene, and benzotrifluoride. Nonlimiting examples of ether solvents include tetrahydrofuran (THF), tetrahydropyran, tetrahydrofurfuryl alcohol, diethyl ether, dibutyl ether, diisopropyl ether, methyl tert-butyl ether (MTBE), 1,2-dimethoxyethane, 1,4-dixoane, 2-methyltetrahydrofuran (2-MeTHF), and cyclopentylmethyl ether. Nonlimiting examples of chlorinated solvents include 1,2-dichloroethane, chloroform, carbon tetrachloride, and dichloromethane. Nonlimiting examples of alcohol solvents include methanol, ethanol, propanol, 2-propanol, and tert-butanol.

In some embodiments, the organic solvent is selected from the group consisting of toluene, benzene, xylene, tetrahydrofuran (THF), tetrahydropyran, tetrahydrofurfuryl alcohol, diethyl ether, dibutyl ether, diisopropyl ether, dimethoxymethane, 1,2-dimethoxyethane, 1,4-dixoane, dichloromethane (DCM), carbon tetrachloride, chloroform, 1,2-dichloroethane, 2-methyltetrahydrofuran (2-MeTHF), methyl tert-butyl ether (MTBE), and a combination thereof. In some embodiments, the organic solvent is selected from the group consisting of toluene, THF, DCM, and a combination thereof. In some embodiments, the organic solvent is toluene.

The solvent can be included in an amount of 5 L/kg of compound B to 25 L/kg of compound B, for example, at least about 5, 10, 15, or 20 L/kg of compound B and/or up to about 25, 20, 25, or 10 L/kg of compound B, such as, 5 L/kg to 20 L/kg, 5 L/kg to 15 L/kg, or 5 L/kg to 10 L/kg. In some embodiments, the solvent is present in an amount of 10 L/kg of compound B.

In some embodiments, step (a) further comprises admixing

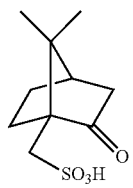

(camphorsulfonic acid) in the organic solvent with compounds B and C. As described herein, camphorsulfonic acid can be used to prepare a salt form of compound B. Advantageously, the salt form of compound B can be formed in situ, and does not need to be isolated prior to using in step (a) of the processes described herein.

Step (a) can occur at a temperature of 10° C. to 40° C., for example, at least 10, 12, 15, 17, 20, 22, 25, 27, or 30° C., and/or up to 40, 37, 35, 32, 30, 27, 25, 22, or 20° C., such as, 10° C. to 30° C., 12° C. to 27° C., 15° C. to 25° C., or 17° C. to 22° C. In some embodiments, step (a) occurs at a temperature of 20° C.

The admixing of step (a) can occur for 1 minute to 1 hour, for example, at least 1, 5, 10, 15, 20, 25, 30, 35, or 40 minutes and/or up to 60, 55, 50, 45, 40, 35, 30, 25, or 20 minutes, such as, 5 to 45 minutes, 10 to 40 minutes, 15 to 40 minutes, 20 to 45 minutes, or 25 to 35 minutes. In some embodiments, the admixing of step (a) occurs for 30 minutes.

Step B

The processes of the disclosure include admixing the slurry of step (a) and a reducing agent to form a mixture comprising compound D. Step (b) can be carried out in the same or different reaction vessel as step (a). In some embodiments, step (b) occurs in the same reaction vessel as step (a).

As provided herein, compound D is

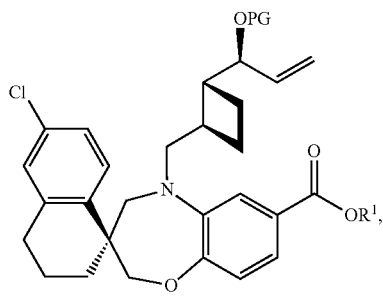

wherein each of $R^1$ and OPG are as described herein. In some embodiments, $R^1$ is H and OPG is 4-bromobenzoyl, i.e., compound D has a structure

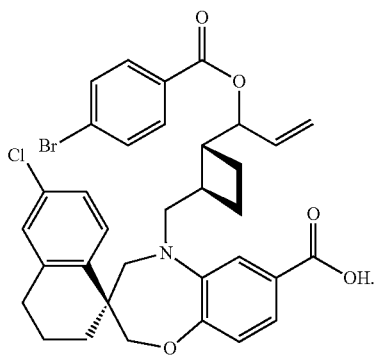

The reducing agent is any agent that reduces the nitrogen-carbon double bond that formed between compound B and C in step (a). The reducing agent can be, for example, a metal hydride, hydrogen/metal catalyst, an organometallic reagent, or an electron donors, which are used in combination with protons, wherein the electrons are donated by a cathode or a metal selected from Li, Na, K, Mg, Zn, Fe and Al. Metal hydrides include boron and aluminum hydrides. Examples of hydrides of boron or aluminum include $NaBH_4$, $NaB(CN)H_3$, $NaBH(OAc)_3$, $LiAlH_4$, $LiAlH(Otert-Bu)_4$, $LiBH_4$, $LiBHEt_3$, and $LiBH(sec-Bu)_3$. In some cases, the reducing agent is selected from the group consisting of a borohydride, a borane, a silane, a Hantzsch ester, a formic acid/amine base/metal catalyst, and a hydrogen/metal catalyst. Hantzsch esters, 1,4-dihydrobenzol, isopropanol, formic acid, and ammonium formate are transfer hydrogenation reagents, and are hydrogen sources as they can transfer a hydride ion and a proton. Reactions with these transfer hydrogenation reagents can be carried out metal-free, i.e. in the absence of a metal catalyst.

In some embodiments, the reducing agent is a borohydride. Examples of suitable borohydrides include, but are not limited to, $NaBH(OAc)_3$, $NaBH_3CN$, $NaBH_4$. In some embodiments, the reducing agent is $NaBH(OAc)_3$.

In some embodiments, the reducing agent is a borane. Examples of suitable boranes include, but are not limited to, picoline borane (pic-$BH_3$), borane tetrahydrofuran ($BH_3$-THF), decaborane ($B_{10}H_{14}$), borane dimethyl sulfide ($BH_3$—$S(Me)_2$), and N-heterocyclic carbene boranes (NHC-borane). One example of an NHC-borane is 1,3-dimethylimidazol-2-ylidene borane (diMe-Imd-$BH_3$).

In some embodiments, the reducing agent is a silane. Examples of suitable silanes include, but are not limited to, triethylsilane, phenylsilane, diphenylsilane, trichlorosilane, triphenylsilane, (tris)trimethylsilane, and phenylmethylsilane.

In some embodiments, the reducing agent is a Hantzsch ester. Examples of suitable Hantzsch esters include, but are not limited to,

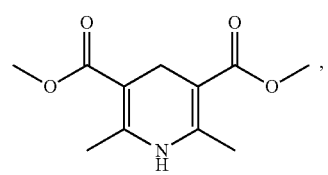

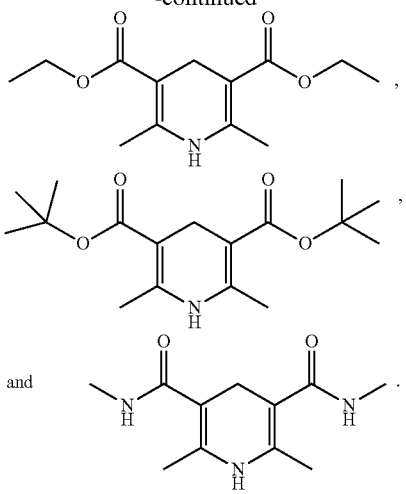

and

In some embodiments, the reducing agent is a formic acid/amine base/metal catalyst. Examples of suitable amine bases include tertiary amine bases, such as triethylamine and diisopropylethyl amine. Examples of suitable metal catalysts include, but are not limited to, palladium (Pd), iridium (Ir), ruthenium (Ru), and rhodium (Rh). Examples of suitable formic acid/amine base/metal catalyst include, but are not limited to, formic acid/triethylamine/Ir, formic acid/triethylamine/Ru, and formic acid/triethylamine/Rh.

In some embodiments, the reducing agent is a hydrogen/metal catalyst, including, but not limited to $H_2$/Pd, $H_2$/Rh, $H_2$/Ir, and $H_2$/Ru.

In some embodiments, the reducing agent is selected from the group consisting of $NaBH(OAc)_3$, $NaBH_3CN$, $NaBH_4$, picoline borane (pic-$BH_3$), borane tetrahydrofuran ($BH_3$-THF), decaborane ($B_{10}H_{14}$), borane dimethyl sulfide ($BH_3$—$S(Me)_2$), an N-heterocyclic carbene borane (NHC-borane), triethylsilane, phenylsilane, diphenylsilane,

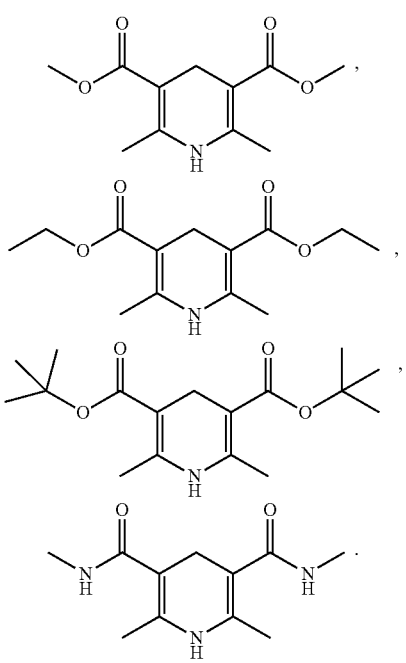

H₂/Pd, H₂/Rh, and H₂/Ru, formic acid/triethylamine/Rh, formic acid/triethylamine/Ir, and formic acid/triethylamine/Ru.

Compound B and the reducing agent can be present in a molar ratio of 1:1 to 1:2.25, for example, at least 1:1, 1:1.25, 1:1.5, 1:1.75 or 1:2 and/or up to 1:2.25, 1:1.2, 1:1.75, 1:1.5, or 1:1.25, such as, 1:1 to 1:2, 1:1 to 1:1.75, or 1:1 to 1:1.5. In some embodiments, the molar ratio of compound B to the reducing agent is 1:1.25.

The reducing agent can be added to the slurry of step (a) in a single addition (i.e., all at once), or in increments (i.e., portions) over time. It will be understood that the practicalities of adding the reducing agent "all at once" to the slurry can take longer than, e.g., 1 second, when dealing with a large scale reaction (e.g., kilogram scale material). As such, in some embodiments, the reducing agent is added to the slurry within 60 seconds, and in some cases, within 30 seconds or within 10 seconds, and is considered to be added all at once to the slurry. When the reducing agent is not added all at once, it can be added in portions or continuously over a longer period of time. In some embodiments, the reducing agent is added to the slurry over 10 minutes to 1 hour, for example over at least 10, 15, 20, 25, 30, 35, or 40 minutes and/or up to 60, 55, 50, 45, 40, 35, 30, or 25 minutes, such as, 10 to 45 minutes, 15 to 30 minutes, or 20 to 30 minutes. In some embodiments, the reducing agent is added to the slurry in two or more equal portions. In some embodiments, the reducing agent is added to the slurry in four equal portions. In some embodiments, each of the two or more (e.g., four) equal portions are added 15 minutes apart.

Step (b) can occur at a temperature of 10° C. to 40° C., for example, at least 10, 12, 15, 17, 20, 22, 25, 27, or 30° C., and/or up to 40, 37, 35, 32, 30, 27, 25, 22, or 20° C., such as 12° C. to 35° C., 15° C. to 30° C., 17° C. to 25° C., or 20° C. to 25° C. In some embodiments, step (b) occurs at a temperature of 20° C.

The admixing of step (b) can occur for 5 hours to 20 hours, for example at least 5, 7, 10, 12, 16, or 15 hours and/or up to 20, 17, 16, 15, 12, 10, or 7 hours, such as, 10 to 20 hours, 12 to 20 hours, 12 to 17 hours, or 15 to 17 hours. In some embodiments, the admixing occurs for 16 hours.

Step C

In some embodiments, the processes of the disclosure can further include extracting compound D from the mixture of step (b). In some embodiments, the extracting occurs by crystallizing compound D from the mixture. The crystallizing can be performed with an organic solvent selected from the group consisting of toluene, benzene, xylene, tetrahydrofuran (THF), tetrahydropyran, tetrahydrofurfuryl alcohol, heptane, diethyl ether, dibutyl ether, diisopropyl ether, dimethoxymethane, dimethoxyethane (DME), 1,4-dixoane, dichloromethane (DCM), carbon tetrachloride, chloroform, 1,2-dichloroethane, 2-methyltetrahydrofuran (2-MeTHF), methyl tert-butyl ether (MTBE), and a combination thereof. In some embodiments, compound D is crystallized from the mixture using toluene and heptane. In some cases, a seed crystal of compound D is added during crystallizing to assist in forming compound D crystal. In some cases, the crystals of compound D are filtered and dried.

The process for synthesizing compound D can be used to synthesize compounds A1 and A2. As shown in Scheme 3, below, compound D can be used to synthesize compound A1, or salts or solvates thereof. As shown in Scheme 4, below, compound D can be used to synthesize compound A2, or salts or solvates thereof.

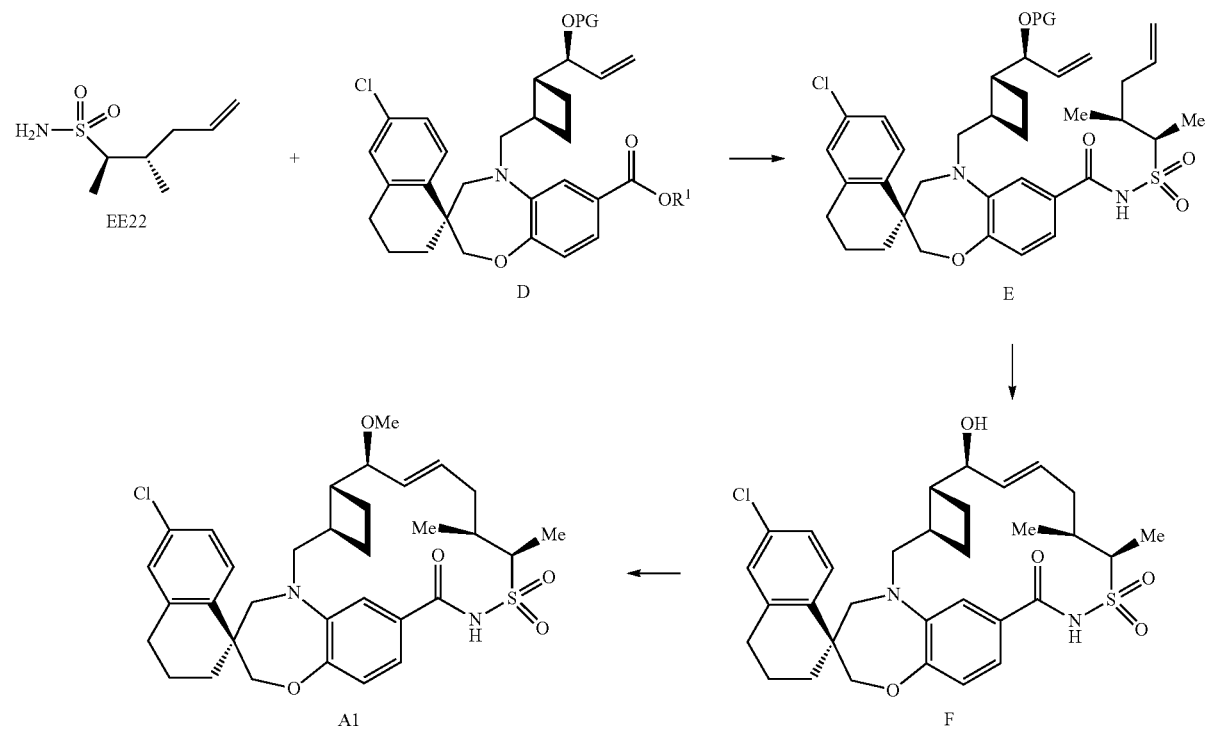

Scheme 3—Conversion of Compound D to Compound A1

As shown in Scheme 3 and described in U.S. Pat. No. 9,562,061, compound D can be used to synthesize compound A1 and salts and solvates thereof. The synthesis of sulfonamide EE22 is disclosed in U.S. Pat. No. 9,562,061. Compounds EE22 and D can be reacted to form compound E. Cyclization and deprotection of compound E provides compound F which can then be methylated to provide compound A1 as described in U.S. Pat. No. 9,562,061.

cyclized to provide compound F. Compound F can then be oxidized to provide compound G, as disclosed in U.S. Pat. No. 10,300,075. Alternatively, compound E can be oxidized to provide the uncyclized version of compound F, which can then cyclized to provide compound G. Compound G can then be epoxidized to compound H using the procedures disclosed in U.S. Pat. No. 10,300,075. Compound H can then be reacted with bicyclic compound I to provide com-

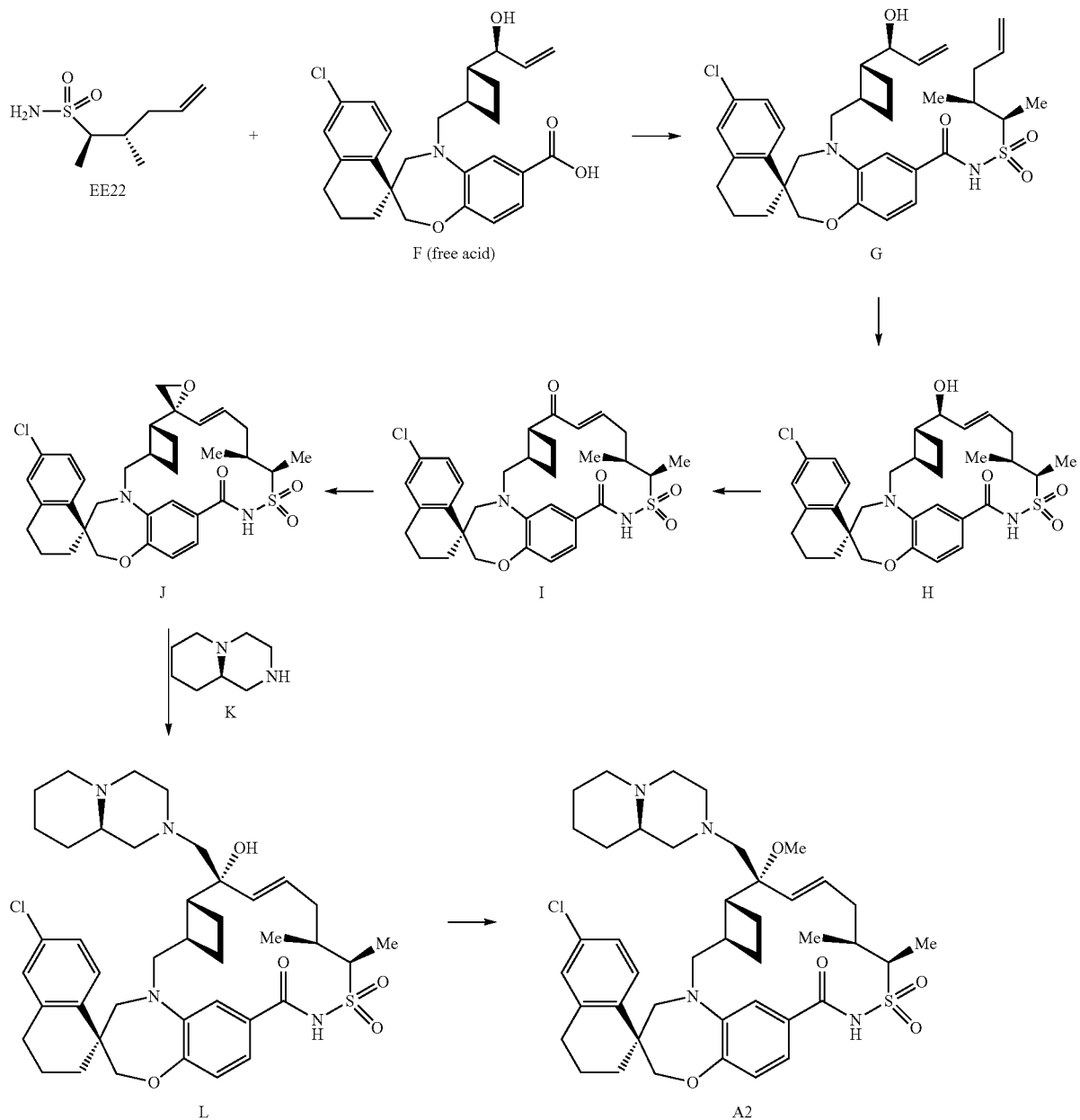

Scheme 4—Conversion of Compound D to Compound A2

As shown in Scheme 4 and described in U.S. Pat. No. 10,300,075, compound D can be used to synthesize compound A2 and salts and solvates thereof. As described above with respect to Scheme 3, the synthesis of sulfonamide EE22 is disclosed in U.S. Pat. No. 9,562,061. Compounds EE22 and D can be reacted to form compound E which can be pound J. Finally, methylation of compound J provides compound A2 as disclosed in U.S. Pat. No. 10,300,075.

In some embodiments, the process further includes synthesizing compound A1 or a salt or solvate thereof using compound D:

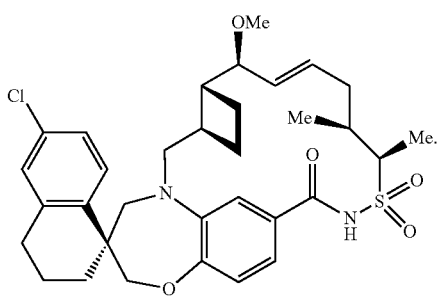

(A1)

In some embodiments, the process further includes synthesizing compound A2 or a salt or solvate thereof using compound D:

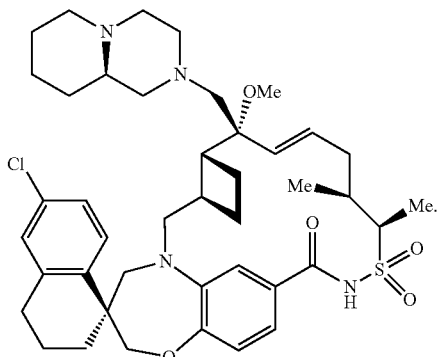

(A2)

It is to be understood that while the disclosure is read in conjunction with the detailed description thereof, the foregoing description and following example are intended to illustrate and not limit the scope of the disclosure, which is defined by the scope of the appended claims. Other aspects, advantages, and modifications are within the scope of the following claims.

EXAMPLES

The following example is provided for illustration and is not intended to limit the scope of the invention.

Example 1

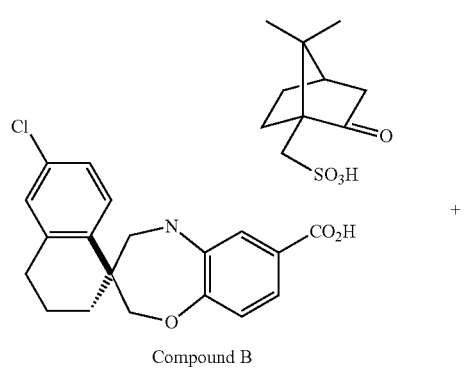

Compound B

+

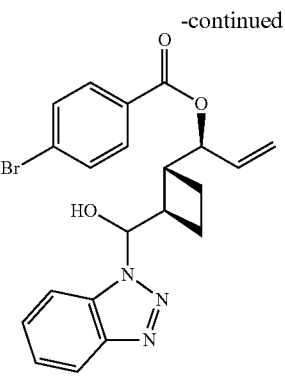

Compound C

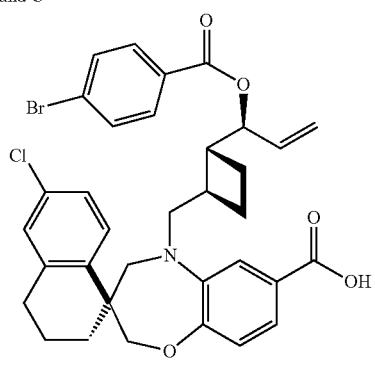

Compound D

To a 500 ml, glass lined, jacketed reactor was charged 25.0 g of Compound B (1.0 equiv, 43.4 mmol), followed by 21.9 g of Compound C (1.1 equiv, 47.7 mmol, 70.4 wt %) and 250 ml of toluene (10 L/kg). The resultant slurry mixture was stirred at 20° C. for 30 min. To the reactor was then charged NaBH(OAc)$_3$ (11.5 g, 1.25 equiv) in 0.25 equivalent portions at 20° C., with each portion charged at least 15 minutes apart. The reaction was stirred at 20° C. for ≥5 hours, until LC analysis confirmed complete consumption of Compound B. To the reaction mixture was charged an aqueous solution of NaCl and NaHCO$_3$ slowly, to control gas evolution observed. The batch was stirred at 20° C. for >30 minutes. The aqueous phase was removed after phase separation. To the reactor containing organic phase was charged aqueous H$_3$PO$_4$ and the resulting mixture was stirred at 20° C. for >15 minutes. The aqueous phase was removed after phase separation. This aqueous H$_3$PO$_4$ washing sequence was repeated two more times. To the reactor containing the organic phase was charged aqueous NaCl, and the mixture was stirred at 20° C. for >15 minutes. The aqueous phase was removed after phase separation. The batch was then concentrated under reduced pressure at ≤55° C., and then the batch was cooled to 20° C. To the reactor was charged Compound D seed to induce crystallization, and the slurry was held at 20° C. for >1 hour. Heptane was then charged to the reactor. After addition, the suspension was stirred at 20° C. for >1 hour. Compound D was obtained after filtration and washing with 2/1 heptane/toluene and dried at 40° C. under vacuum. Compound D was obtained in 85.5 wt %, 85.0% isolated yield over the two steps.

Compound D: $^1$H NMR (600 MHz, CDCl$_3$) δ 7.86 (d, J=8.6 Hz, 2H), 7.64 (d, J=8.5 Hz, 1H), 7.50 (d, J=8.6 Hz, 2H), 7.47 (dd, J=8.2, 1.9 Hz, 1H), 7.44 (d, J=1.9 Hz, 1H), 7.16 (dd, J=8.5, 2.3 Hz, 1H), 7.08 (d, J=2.3 Hz, 1H), 6.93 (d, J=8.2 Hz, 1H), 5.84 (ddd, J=17.1, 10.6, 6.4 Hz, 1H), 5.49 (bt, J=6.4 Hz, 1H), 5.36 (dt, J=17.1, 1.2 Hz, 1H), 5.22 (dt, J=10.6, 1.2 Hz, 1H), 4.12 (d, J=12.1 Hz, 1H), 4.08 (d, J=12.1 Hz, 1H), 3.59 (dd, J=14.8, 4.1 Hz, 1H), 3.52 (d, J=14.4 Hz, 1H), 3.35 (dd, J=14.8, 9.0 Hz, 2H), 3.32 (d, J=14.4 Hz, 1H), 2.78-2.75 (m, 1H), 2.75-2.71 (m, 2H), 2.47 (qui, J=8.5 Hz, 1H), 2.12-2.02 (m, 1H), 2.00-1.92 (m, 1H), 1.93-1.85 (m, 2H), 1.85-1.77 (m, 1H), 1.78-1.69 (m, 2H), 1.56 (bt, J=11.0 Hz, 1H); $^{13}$C NMR (151 MHz, CDCl$_3$) δ 171.8, 165.1, 153.7, 141.0, 139.0, 138.8, 134.3, 132.1, 131.7, 131.0, 129.5, 129.1, 128.6, 128.1, 126.6, 123.7, 121.7, 120.8, 117.5, 117.0, 79.4, 78.0, 60.9, 58.8, 43.0, 41.8, 36.2, 30.2, 29.0, 25.9, 21.2, 19.0. LRMS (ESI): Calculated: 650; Found: 650.1.

What is claimed is:

1. A process for synthesizing compound D:

(D)

comprising:
(a) admixing compound B, or a salt thereof, and compound C in an organic solvent to form a slurry, wherein the organic solvent is selected from the group consisting of a nonpolar aromatic solvent, an ether solvent, a chlorinated solvent, an alcohol solvent, acetonitrile, dimethylformamide (DMF), dimethylcarbonate, dimethylacetamide (DMAc), N-methylpyrrolidinone (NMP), and a combination thereof:

(B)

and (C)

and
(b) admixing the slurry of step (a) and a reducing agent to form a mixture comprising compound D;
wherein:
OPG is an alcohol protecting group selected from the group consisting of an ether, an acetal or ketal, an acyl, a sulfonyl, and a silyl ether;
R$^1$ is H or C$_{1-6}$alkyl; and
R$^2$ is a protected aldehyde.

2. The process of claim 1, further comprising admixing in the organic solvent in step (a).

3. The process of claim 2, wherein compound B is a salt.

4. The process of claim 1, wherein R$^1$ is H.

5. The process of claim 1, wherein R$^1$ is methyl, ethyl, n-propyl, or tert-butyl.

6. The process of claim 1, wherein OPG is selected from the group consisting of (methoxy), (tert-butyl ether), (methoxymethyl acetal, MOM), (2-methoxyethoxymethyl ether, MEM), (ethoxyethyl acetal, EE), (methoxypropyl acetal, MOP),

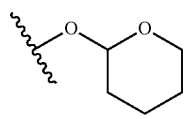 [SMILES: *OC1CCCCO1]
(tetrahydropyranyl acetal, THP),
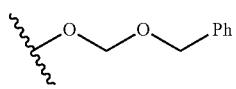 [SMILES: *OCOCc1ccccc1]
(benzyloxymethyl acetal, BOM),
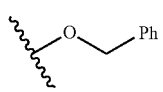
(benzyl ether, Bn),
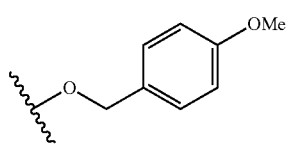 [SMILES: *OCc1ccc(OC)cc1]
(4-methoxybenzyl ether, PMB),
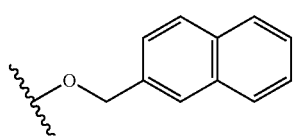 [SMILES: *OCc1ccc2ccccc2c1]
naphthylmethyl ether, Nap),
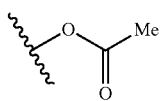 [SMILES: *OC(C)=O]
(acetyl, Ac),
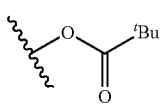
pivaloyl (Piv),
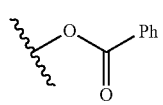
(benzoyl, Bz),
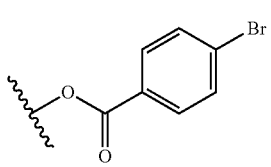 [SMILES: *OC(=O)c1ccc(Br)cc1]
(4-bromobenzoyl, Br-Bz),
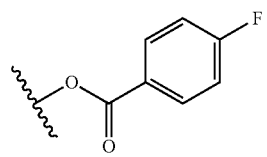 [SMILES: *OC(=O)c1ccc(F)cc1]
(4-fluorobenzoyl),
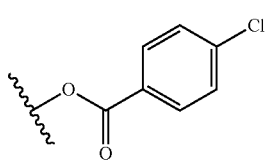 [SMILES: *OC(=O)c1ccc(Cl)cc1]
(4-chlorobenzoyl),
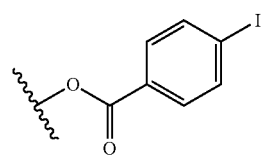 [SMILES: *OC(=O)c1ccc(I)cc1]
(4-iodobenzoyl),
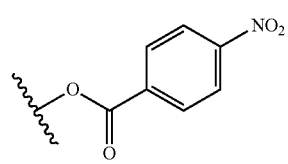 [SMILES: *OC(=O)c1ccc([N+](=O)[O-])cc1]
(4-nitrobenzoyl),
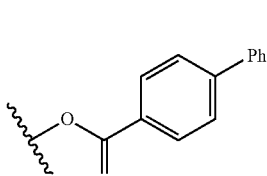
(4-phenylbenzoyl),

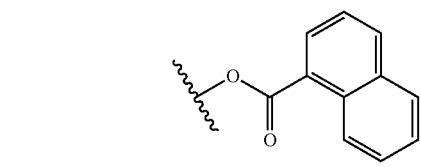 [SMILES: *OC(=O)c1cccc2ccccc12]

(1-naphthoyl ester),

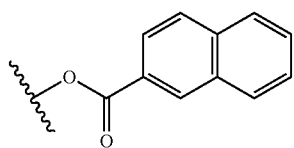 [SMILES: *OC(=O)c1ccc2ccccc2c1]

(2-naphthoyl ester),

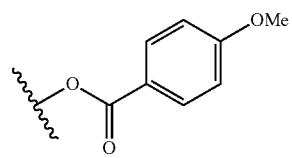 [SMILES: *OC(=O)c1ccc(OC)cc1]

(4-methoxybenzoyl),

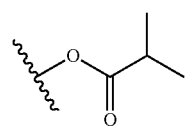 [SMILES: *OC(=O)C(C)C]

(isobutyryl), OSiEt$_3$ (triethylsilyl ether, TES), OSi(Pr)$_3$ (triisopropylsilyl ether, TIPS), OSiMe$_3$ (trimethylsilyl ether, TMS), OSiMe$_2$tBu (tert-butyldimethylsilyl ether, TBS), OSiPh$_2$$^t$Bu (tert-butyldiphenylsilyl ether TBDPS), OSO$_2$Me (mesyl),

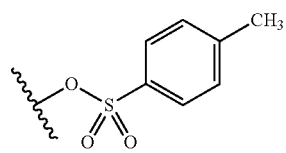 [SMILES: *OS(=O)(=O)c1ccc(C)cc1]

(tosyl),

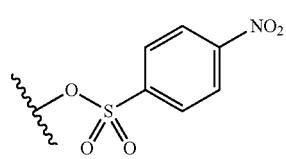 [SMILES: *OS(=O)(=O)c1ccc([N+](=O)[O-])cc1]

(nosyl), and OSO$_2$CF$_3$ (triflyl).

7. The process of claim 6, wherein OPG is 4-bromobnzoyl.

8. The process of claim 1, wherein the protected aldehyde is selected from the group consisting of

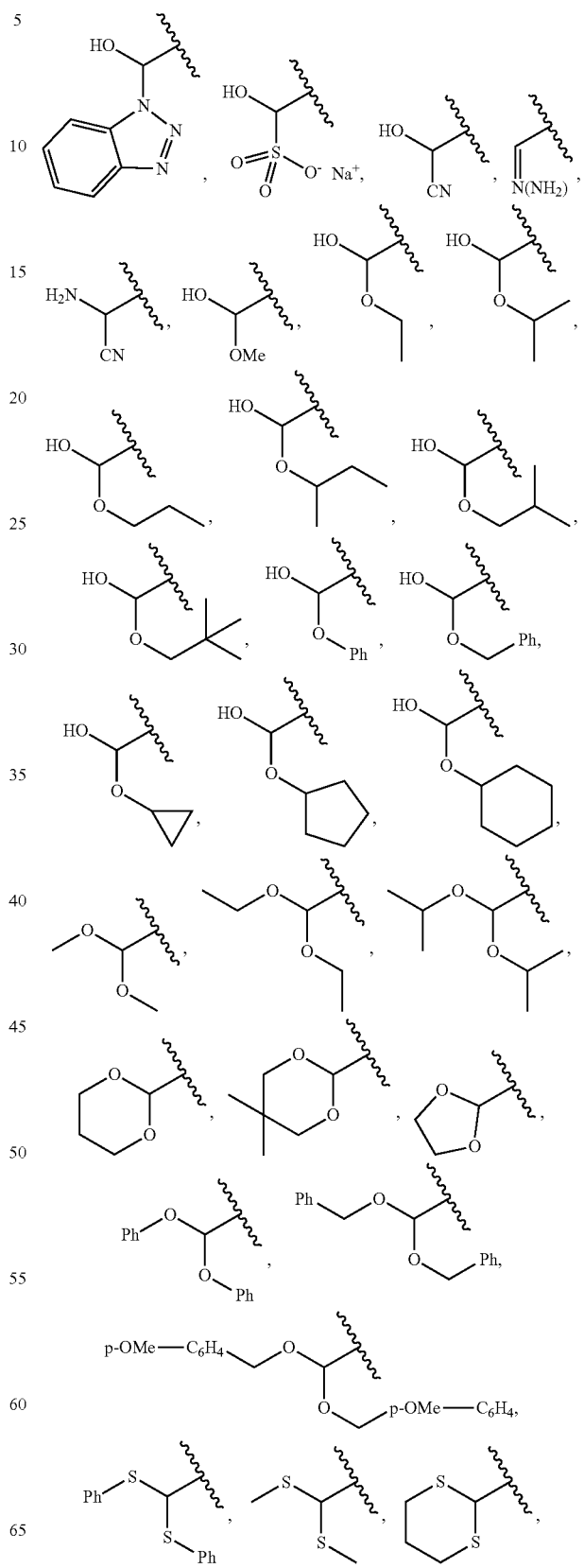

-continued

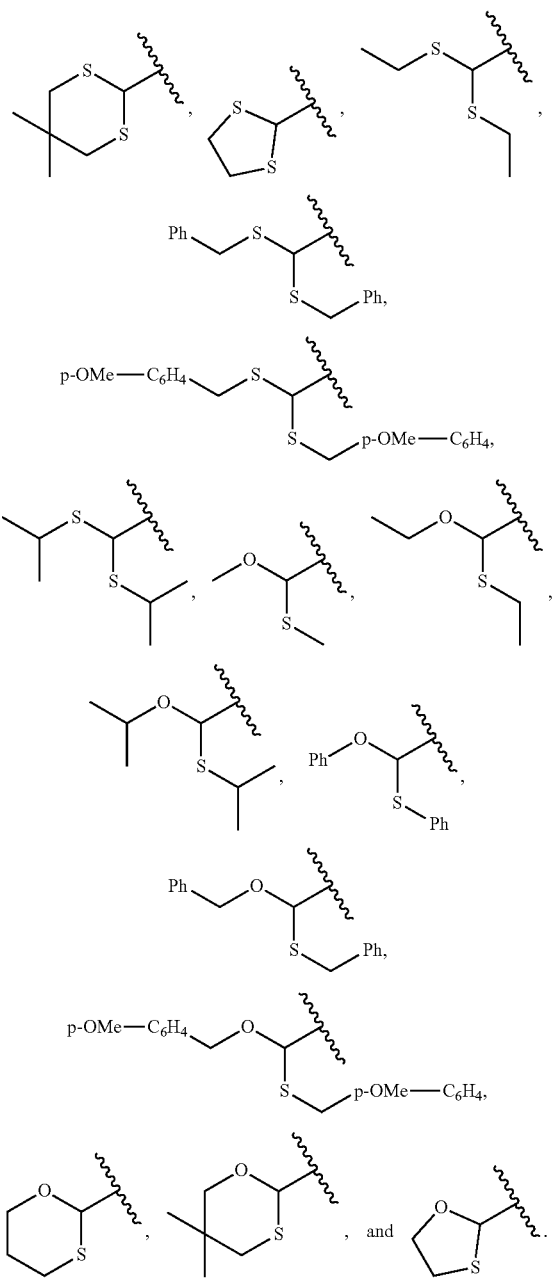

9. The process of claim 8, wherein the protected aldehyde is

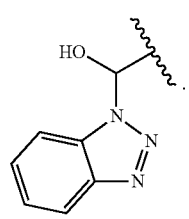 [SMILES: *C(O)n1nnc2ccccc21]

10. The process of claim 9, wherein compound C has a structure:

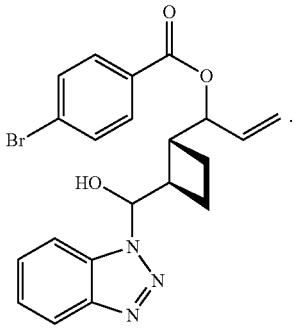

11. The process of claim 1, wherein compound D has a structure:

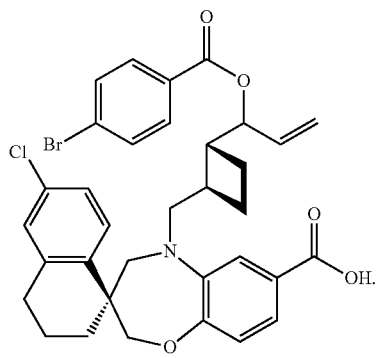

12. The process of claim 1, wherein the reducing agent is selected from the group consisting of a borohydride, a borane, a silane, a Hantzsch ester, a formic acid/amine base/metal catalyst, and a hydrogen/metal catalyst.

13. The process of claim 12, wherein the reducing agent is selected from the group consisting of NaBH(OAc)$_3$, NaBH$_3$CN, NaBH$_4$, picoline borane (pic-BH$_3$), borane tetrahydrofuran (BH$_3$-THF), decaborane (B$_{10}$H$_{14}$), borane dimethyl sulfide (BH$_3$—S(Me)$_2$), an N-heterocyclic carbene borane (NHC-borane), triethylsilane, phenylsilane, diphenylsilane,

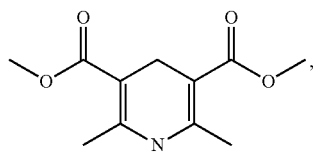

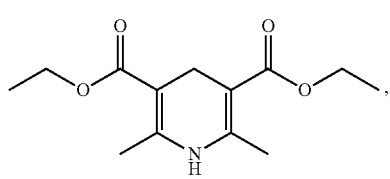

-continued

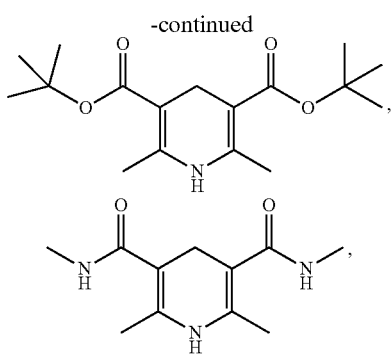

H₂/Pd, H₂/Rh, H₂/Ir, H₂/Ru, formic acid/triethylamine/Rh, formic acid/triethylamine/Ir, and formic acid/triethylamine/Ru.

14. The process of claim 13, wherein the reducing agent is NaBH(OAc)₃.

15. The process of claim 1, wherein the organic solvent is selected from the group consisting of toluene, benzene, xylene, tetrahydrofuran (THF), tetrahydropyran, tetrahydrofurfuryl alcohol, diethyl ether, dibutyl ether, diisopropyl ether, dimethoxymethane, 1,2-dimethoxyethane, 1,4-dixoane, dichloromethane (DCM), carbon tetrachloride, chloroform, 1,2-dichloroethane, 2-methyltetrahydrofuran (2-MeTHF), methyl tert-butyl ether (MTBE), and a combination thereof.

16. The process of claim 15, wherein the organic solvent is selected from the group consisting of toluene, THF, DCM, and a combination thereof.

17. The process of claim 16, wherein the organic solvent is toluene.

18. The process of claim 1, wherein compound B and compound C are present in a molar ratio of B:C of 1:1 to 1:2.

19. The process of claim 18, wherein the molar ratio of B:C is 1:1.1.

20. The process of claim 1, wherein compound B and the reducing agent are present in a molar ratio of 1:1 to 1:2.25.

21. The process of claim 20, wherein the molar ratio of compound B to the reducing agent is 1:1.25.

22. The process of claim 1, wherein each of step (a) and step (b) occurs at a temperature of 10° C. to 40° C.

23. The process of claim 22, wherein each of step (a) and step (b) occurs at a temperature of 20° C.

24. The process of claim 1, wherein the admixing of step (a) occurs for 1 minute to 1 hour.

25. The process of claim 24, wherein the admixing of step (a) occurs for 30 minutes.

26. The process of claim 1, wherein the reducing agent is added to the slurry within 60 seconds.

27. The process of claim 1, wherein the reducing agent is added to the slurry over 10 minutes to 1 hour.

28. The process of claim 27, wherein the reducing agent is added to the slurry in two or more equal portions.

29. The process of claim 28, wherein the reducing agent is added to the slurry in four equal portions.

30. The process of claim 28, wherein the equal portions are added 15 minutes apart.

31. The process of claim 1, wherein the admixing of step (b) occurs for 5 hours to 20 hours.

32. The process of claim 31, wherein the admixing of step (b) occurs for 16 hours.

33. The process of claim 1, wherein steps (a) and (b) occur in sequence in a single reaction vessel.

34. The process of claim 1, further comprising
(c) extracting compound D from the mixture of step (b).

35. The process of claim 34, wherein the extracting is via crystallizing compound D.

36. The process of claim 35, wherein the crystallizing is performed with an organic solvent selected from the group consisting of toluene, benzene, xylene, tetrahydrofuran (THF), tetrahydropyran, tetrahydrofurfuryl alcohol, heptane, diethyl ether, dibutyl ether, diisopropyl ether, dimethoxymethane, dimethoxyethane (DME), 1,4-dixoane, dichloromethane (DCM), carbon tetrachloride, chloroform, 1,2-dichloroethane, methyl tert-butyl ether (MTBE), 2-methyltetrahydrofuran (2-MeTHF), and a combination thereof.

37. The process of claim 36, wherein the crystallizing is performed with toluene and heptane.

38. The process of claim 1, further comprising synthesizing compound A1, or a salt thereof, using compound D:

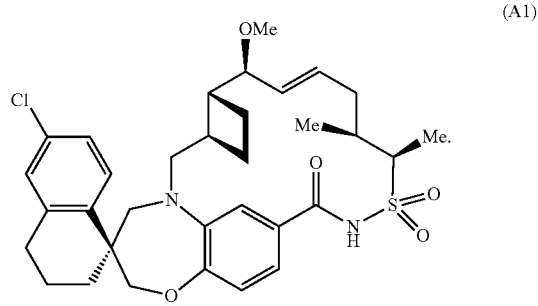

39. The process of claim 1, further comprising synthesizing compound A2, or a salt thereof, using compound D:

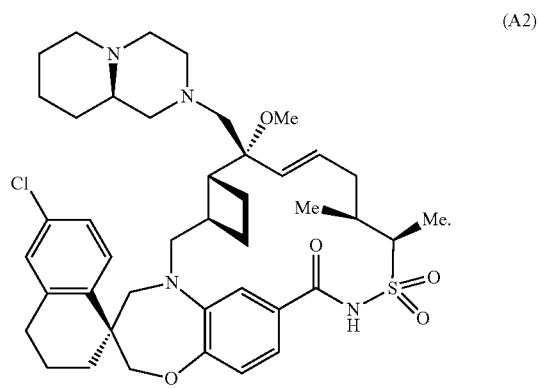

* * * * *